(12) United States Patent
Mazaika

(10) Patent No.: US 12,427,845 B2
(45) Date of Patent: Sep. 30, 2025

(54) ELECTRIC VEHICLE BATTERY MODULE

(71) Applicant: COULOMB SOLUTIONS, INC., Livermore, CA (US)

(72) Inventor: David Michael Mazaika, Livermore, CA (US)

(73) Assignee: COULOMB SOLUTIONS, INC., Livermore, CA (US)

( * ) Notice: Subject to any disclaimer, the term of this patent is extended or adjusted under 35 U.S.C. 154(b) by 320 days.

(21) Appl. No.: 18/074,230

(22) Filed: Dec. 2, 2022

(65) Prior Publication Data
US 2023/0302891 A1 Sep. 28, 2023

Related U.S. Application Data

(63) Continuation of application No. PCT/US2022/021434, filed on Mar. 22, 2022.

(51) Int. Cl.
| | |
|---|---|
| *B60K 1/04* | (2019.01) |
| *B60L 50/60* | (2019.01) |
| *B60L 50/64* | (2019.01) |
| *H01M 50/204* | (2021.01) |

(Continued)

(52) U.S. Cl.
CPC ............... *B60K 1/04* (2013.01); *B60L 50/64* (2019.02); *B60L 50/66* (2019.02); *H01M 50/204* (2021.01); *H01M 50/242* (2021.01); *H01M 50/262* (2021.01); *B60L 2200/36* (2013.01); *H01M 2220/20* (2013.01)

(58) Field of Classification Search
CPC . B60K 1/04; B60L 50/64; B60L 50/66; B60L 2200/36; H01M 50/204; H01M 50/242; H01M 2220/20
See application file for complete search history.

(56) References Cited

U.S. PATENT DOCUMENTS

| | | | |
|---|---|---|---|
| 8,739,908 B2 | 6/2014 | Taniguchi et al. | |
| 10,252,632 B2 | 4/2019 | Hernandez et al. | |
| 10,562,404 B1 * | 2/2020 | Khaligh | H02M 1/12 |

(Continued)

FOREIGN PATENT DOCUMENTS

| | | |
|---|---|---|
| CN | 107240651 A | 10/2017 |
| CN | 108011061 A | 5/2018 |

OTHER PUBLICATIONS

International Patent Application No. PCT/US2022/021434; Int'l Search Report and the Written Opinion; dated Jun. 29, 2022; 8 pages.

*Primary Examiner* — Jason D Shanske
*Assistant Examiner* — James J Triggs
(74) *Attorney, Agent, or Firm* — BAKER HOSTETLER, LLP

(57) ABSTRACT

A system may comprise a vehicle having a frame. One or more rails may form at least a portion of the frame. The system may comprise a container configured to be mounted to the one or more rails. The system may comprise a plurality of battery packs positioned within the container below the one or more rails. Each of the plurality of battery packs may extend across an entire length of the container. The system may comprise a power distribution unit (PDU) to which the plurality of battery packs are connected. The plurality of battery packs may be configured to provide power to at least one component of the vehicle via the PDU. The container may protect against road debris and moisture.

16 Claims, 10 Drawing Sheets

(51) Int. Cl.
*H01M 50/242* (2021.01)
*H01M 50/262* (2021.01)

(56) References Cited

U.S. PATENT DOCUMENTS

| | | |
|---|---|---|
| 10,780,767 B2 | 9/2020 | Rawlinson et al. |
| 11,040,610 B2 * | 6/2021 | Sloan .................. B60K 1/04 |
| 2012/0223113 A1 | 9/2012 | Gaisne et al. |

* cited by examiner

ELECTRIC VEHICLE BATTERY MODULE

The present application is a Continuation of International Patent Application No. PCT/US2022/021434, Filed Mar. 22, 2022, titled ELECTRIC VEHICLE BATTERY MODULE, the entire contents of which are incorporated by reference herein.

TECHNICAL FIELD

The present disclosure generally relates to a battery module for an electric vehicle.

BACKGROUND

Vehicles that run on battery power, such as hybrid vehicles and electric vehicles, are becoming increasingly popular. Such vehicles provide a number of advantages over vehicles that do not utilize battery power. For example, such vehicles save drivers money, as no fuel is required. Such vehicles are also environmentally friendly as they do not emit pollutants. However, some electric vehicles may need to power a large quantity of components and/or drive long distances. It may be difficult to provide sufficient battery power for these electric vehicles. Therefore, improvements in batteries for electric vehicles are desirable.

DISCLOSURE

The present application is further understood when read in conjunction with the appended drawings. For the purpose of illustrating the subject matter, there are shown in the drawings exemplary aspects of the subject matter; however, the presently disclosed subject matter is not limited to the specific methods, devices, and systems disclosed.

Systems and methods are disclosed herein for an electric vehicle battery module. A battery power system may comprise vehicle having a frame, wherein one or more rails form at least a portion of the frame. The system may comprise a container configured to be mounted to the one or more rails. The system may comprise a plurality of battery packs positioned within the container below the one or more rails. Each of the plurality of battery packs may extend across an entire length of the container. The system may include a power distribution unit (PDU) to which the plurality of battery packs are connected. The plurality of battery packs may be configured to provide power to at least one component of the vehicle via the PDU. The container may protect against road debris and moisture.

A method for assembling a battery power system may comprise mounting a container to one or more rails. The one or more rails may form at least a portion of a frame of a vehicle. The method may comprise inserting a plurality of battery packs within the container. The plurality of battery packs may be positioned within the container below the one or more rails when the container is mounted to the one or more rails. Each of the plurality of battery packs may be formed of blade batteries or cell strings and may extend across an entire length of the container. The container may protect the plurality of battery packs against road debris and moisture. The method may comprise connecting at least one of an electrical component of the vehicle and a PDU to the plurality of battery packs. The plurality of battery packs may be configured to provide power to at least one component of the vehicle via the PDU.

A method for assembling a battery power system aspects include improving the structural strength of the chassis by way of one or more battery packs extended across an entire length.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to features that solve any or all disadvantages noted in any part of this disclosure.

DRAWINGS

The present application is further understood when read in conjunction with the appended drawings. For the purpose of illustrating the subject matter, there are shown in the drawings exemplary aspects of the subject matter; however, the presently disclosed subject matter is not limited to the specific methods, devices, and systems disclosed. In the drawings.

The components in the figures are not necessarily to scale, emphasis instead being placed upon illustrating the principles of the disclosure. All descriptions and callouts in the Figures and all content therein are hereby incorporated by this reference as if fully set forth herein. All citations are hereby incorporated by this reference as if fully set forth herein. Aspects of the disclosure will now be described in detail with reference to the drawings, wherein like reference numbers refer to like elements throughout, unless specified otherwise.

FURTHER DISCLOSURE

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular exemplars by way of example only and is not intended to be limiting of the claimed disclosure.

Figure 1:
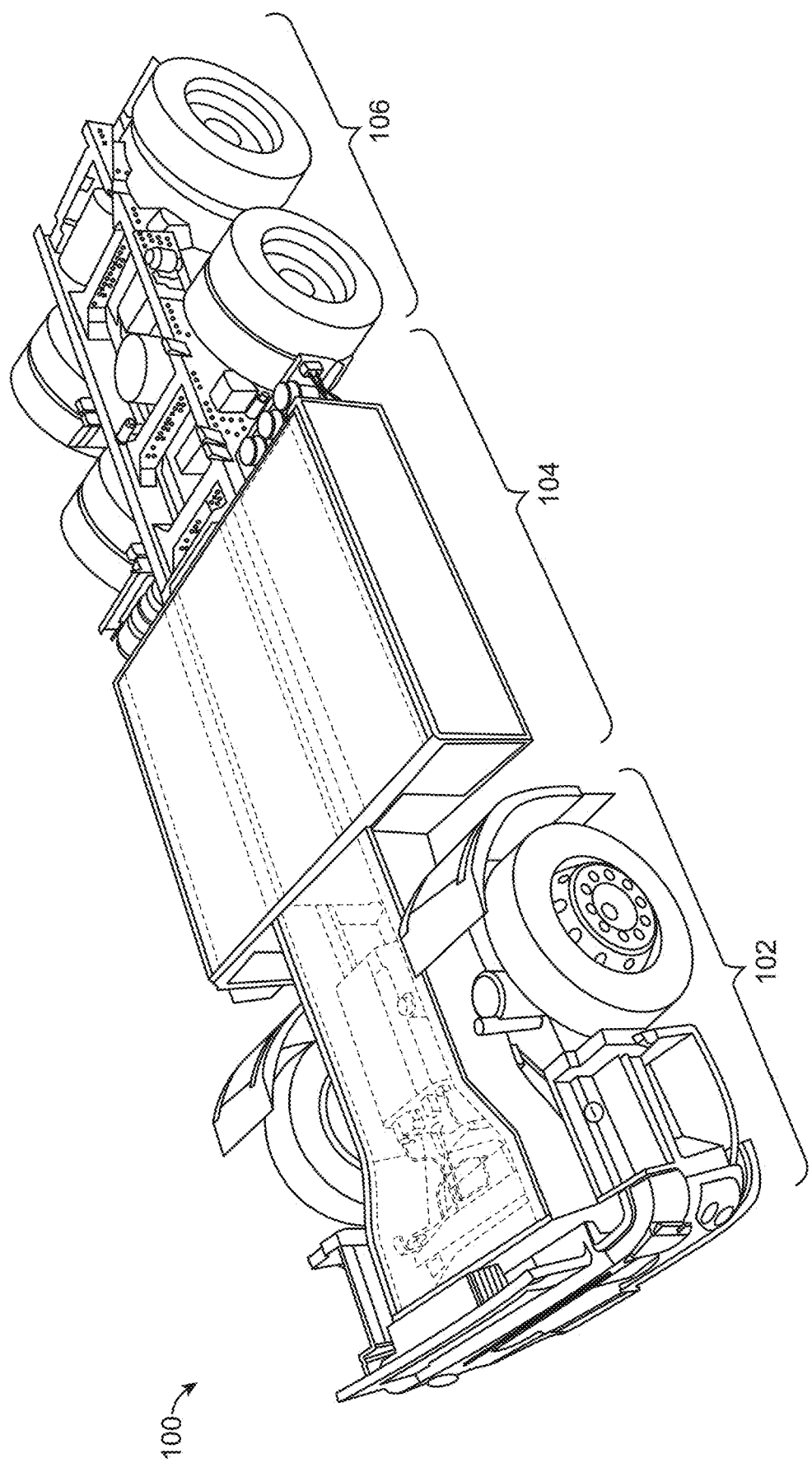
FIG. 1 shows an example electric vehicle chassis system including a battery module.

Presently disclosed are aspects of systems for electric vehicle battery modules and methods for assembling such electric vehicle battery modules. FIG. 1 shows a chassis system 100 for an electric vehicle. The system 100 includes a first module 102, a second module 104, and a third module 106. The first module 102 may include mounts for a front axle, suspension, and steering of the electric vehicle. The first module 102 may additionally include an accessory module associated with one or more accessories of the electric vehicle. The third module 106 may include mounts for rear axles and suspension of the electric vehicle.

The second module 104 may be an electric vehicle battery module. The electric vehicle battery module may be a large, structural battery pack (also called out as a "cell string" or "blade" batteries) that is configured to provide power to at least one component of the electric vehicle. For example, the electric vehicle battery module may include a one or more battery packs configured to provide power to at least one component of the electric vehicle. The at least one component may be located in the first module 102 or the third module 106. For example, the at least one component can include the at least one component comprises a main driver inverter, a motor, a steering pump, an AC compressor, a DC-DC converter, a cabin heater, a cooling system, a charger, an air compressor, an accessory inverter, and/or any other component of the electric vehicle. Exemplary electric vehicle battery modules are discussed below in more detail with regard to FIGS. 2-5.

The second module 104 is configured to be connected to and interposed between the first module 102 and the third module 106. In some exemplars, the second module 104 may be bolted to the first module 102 and the third module 106 so that the second module 104 is positioned in between the first module 102 and the third module 106.

In other exemplars, the second module 104 may be connected to frame rails that run through the first module 102 and the third module 106 so that the second module 104 is positioned in between the first module 102 and the third module 106. For example, the second module 104 may be positioned in between the first module 102 and the third module 106 so that the frame rails run through the second module 104. In this manner, the frame rails of the vehicle may be used to suspend the second module 104. By connecting the second module 104 to existing frame rails, track manufacturers may be able to integrate the second module 104 into an existing chassis without the need for time-consuming or expensive chassis redesign.

In some exemplary implementations, the dimensions of the second module 104 may be selected in order to maximize the quantity of battery packs that are able to fit within the second module 104. For example, the second module 104 may be 80 to 100 inches in length, 80 to 100 inches wide, and 20-40 inches tall. The second module 104 may include, for example, one, two, three, four, five, six, seven, eight, nine, or any other quantity of battery packs. However, it should be appreciated that the second module 104 may have any other suitable dimensions that allow for a sufficient quantity of battery packs to be incorporated within the second module 104.

Figure 2:
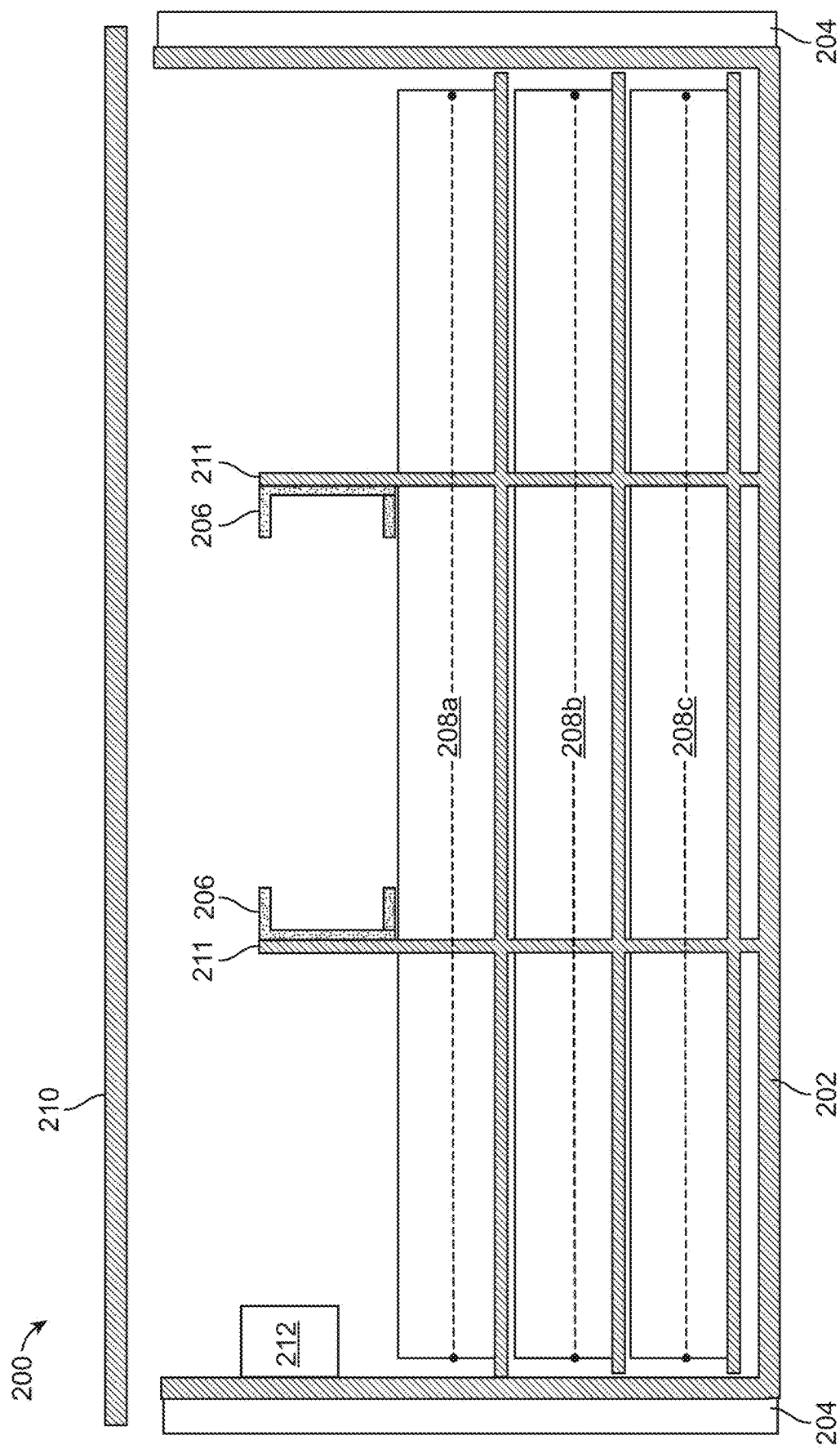
FIG. 2 shows an example electric vehicle battery module.

As mentioned above, the second module 104 may be an electric vehicle battery module bolted to the frame rails of a chassis. FIG. 2 shows an example electric vehicle battery module 200. The electric vehicle battery module 200 includes a container 202 configured to be mounted to frame rails 206 (i.e., C-channels) forming at least a portion of a frame of an electric vehicle. For example, the container 202 may include one or more tabs 211 that extend from a bottom surface of the container 202 and are affixed to (i.e., bolted to, or otherwise attached to) the frame rails 206. The electric vehicle may be any vehicle, including a truck, a van, or a trailer. The electric vehicle battery module 200 includes a lid 210 configured to cover an open top of the container 202.

The electric vehicle battery module 200 includes a plurality of battery packs 208a-c enclosed within the container 202. The plurality of battery packs 208a-c may be positioned within the container below the frame rails 206. The tabs 211 may, for example, wrap around and above the plurality of battery packs 208a-c towards the tabs 211. Each of the plurality of battery packs 208a-c may have a width that is one meter, two meters, three meters, or any other width. Each of the plurality of battery packs 208a-c may have a length that is significantly greater than its height. For example, each of the plurality of battery packs 208a-c may have a length that extends across an entire length of the container 202.

The cell strings constructed in this fashion form strong beams which may extend completely across a container. In this manner they form many strong vertical beams much as how a second story is added to a house. The cell strings and enclosure are configured to cooperate and functions as one strong monolithic block which provides strength in the vertical and lateral directions based on the dimensions. Since the strength of a rectangular beam is proportional to its width times the square of its height, the cell strings with a large vertical component and relatively narrow width maximize the "squared" strength dimension. Due to the high section modulus of the battery packs, the Resisting Bending Moment of the chassis is significantly increased.

Typically a ladder frame uses crossmembers to provide torsional rigidity. This structure keeps side loads from twisting the frame. By including a single large monolithic pack in the center of a frame, the torsional rigidity is increased due to both the large vertical members of the enclosure oriented transversely to the vehicle axis.

The pack may be comprised of composite materials which can provide a light weight yet very strong structure which would provide high strength even using traditional battery modules.

If each of the plurality of battery packs 208a-c has a length that is significantly greater than its height, the plurality of battery packs 208a-c may form a structurally strong battery pack. As such, the plurality of battery packs 208a-c may not need additional structural support from the container 202. The container 202 may protect the plurality of battery packs 208a-c against road debris and moisture. The container 202 may be lightweight so as to not add any unnecessary weight to the electric vehicle battery module 200. The container 202 may or may not provide additional structural support.

In some exemplars, the tabs 211 are attached to the plurality of battery packs 208a-c but not necessarily to the container 202. For example, the tabs 211 may extend from a bottom of the plurality of battery packs 208a-c. In this manner, the plurality of battery packs 208a-c may be attached to the frame rails 206 via the tabs 211. The container 202 may surround the plurality of battery packs 208a-c. For example, one or more of the plurality of battery packs 208a-c may be attached to (i.e., bolted to) an inside wall of the container 202.

The plurality of battery packs 208a-c may be connected to a power distribution unit (PDU). The plurality of battery packs 208a-c may provide power to at least one component of the electric vehicle via the PDU. The PDU to which the plurality of battery packs 208a-c are connected may be located in the accessory module (i.e., in the first module 102). Optionally, the PDU may instead be located inside of the container 202. A PDU 212 may be included inside of the container 202. For example, the PDU 212 may include connections to a motor and/or inverter(s) of the electric vehicle. By including the PDU 212 inside of the container 202, the PDU in the accessory module may be eliminated, thus reducing weight and lowering cost.

In some exemplars, aspects include the electric vehicle battery module 200 having a layer of material 204 connected to at least one external side or end wall of the container 202. The layer of material may be configured to protect the plurality of battery packs 208a-c from damage. For example, the layer of material may be configured to protect the plurality of battery packs 208a-c from damage during impact. The layer of material 204 may be of any thickness. For example, the layer of material 204 may have a thickness of one, two, three, four, or five inches. The layer of material 204 may be, for example, one or more crush beams. The layer of material 204 may be riveted on, bolted on, and/or glued on to both external end walls of the container 202.

Figure 3:
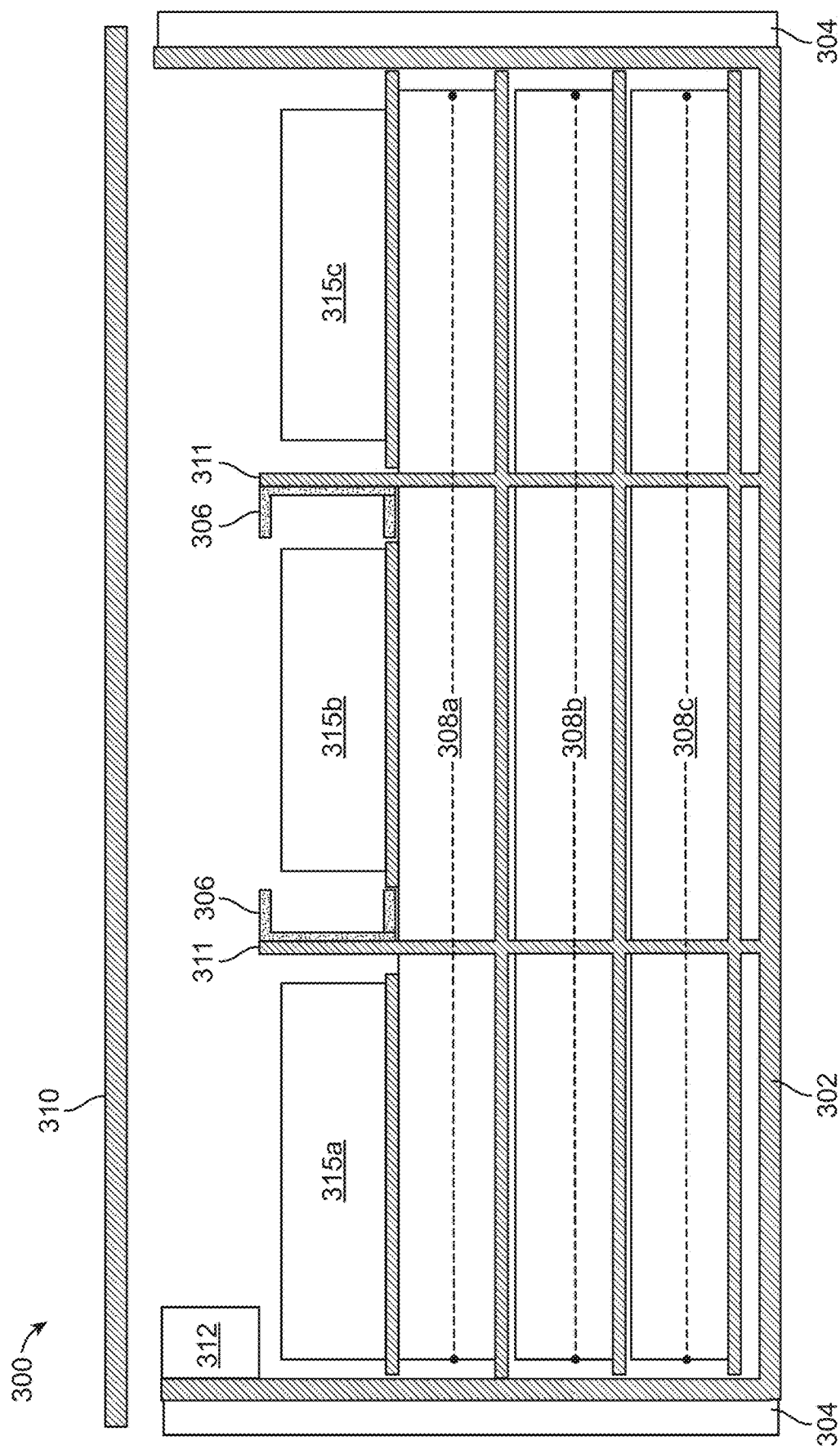
FIG. 3 shows another example electric vehicle battery module.

FIG. 3 shows aspects of an electric vehicle battery module 300. The electric vehicle battery module 300 includes a container 302 configured to be mounted to frame rails 306 (i.e., C-channels) forming at least a portion of a frame of an electric vehicle. For example, the container 302 may include one or more tabs 311 that extend from a bottom surface of the container 302 and are bolted to (or otherwise attached) the frame rails 306. The electric vehicle may be any vehicle, including a truck, a van, or a trailer. The electric vehicle battery module 300 includes a lid 310 configured to cover an open top of the container 302.

The electric vehicle battery module 300 includes a plurality of battery packs 308a-c enclosed within the container 302. The plurality of battery packs 308a-c may be positioned within the container below the frame rails 306. The tabs 311 may, for example, wrap around and above the plurality of battery packs 308a-c towards the tabs 311. Each of the plurality of battery packs 308a-c may have a width that is one meter, two meters, three meters, or any other width. Each of the plurality of battery packs 308a-c may have a length that is significantly greater than its height. For example, each of the plurality of battery packs 308a-c may have a length that extends across an entire length of the container 302.

If each of the plurality of battery packs 308a-c has a length that is significantly greater than its height, the plurality of battery packs 308a-c may form a structurally strong battery pack. As such, the plurality of battery packs 308a-c may not need additional structural support from the container 302. The container 302 may protect the plurality of battery packs 208a-c against road debris and moisture. The container 302 may be lightweight so as to not add any unnecessary weight to the electric vehicle battery module 300. The container 302 may or may not provide additional structural support.

In some exemplars, the tabs 311 are attached to the plurality of battery packs 308a-c but not necessarily to the container 302. For example, the tabs 311 may extend from a bottom of the plurality of battery packs 308a-c. In this manner, the plurality of battery packs 308a-c may be attached to the frame rails 306 via the tabs 311. The container 202 may surround the plurality of battery packs 308a-c. For example, one or more of the plurality of battery packs 308a-c may be attached to (i.e., bolted to) an inside wall of the container 302.

The plurality of battery packs 308a-c may be connected to a power distribution unit (PDU). The plurality of battery packs 308a-c may provide power to at least one component of the electric vehicle via the PDU. The PDU to which the plurality of battery packs 308a-c are connected may be located in the accessory module (i.e., in the first module 102). Optionally, the PDU may instead be located inside of the container 302. A PDU 312 may be included inside of the container 302. For example, the PDU 312 may include connections to a motor and/or inverter(s) of the electric vehicle. By including the PDU 312 inside of the container 302, the PDU in the accessory module may be eliminated, thus reducing weight and lowering cost.

In some exemplars, aspects include the electric vehicle battery module 300 having a layer of material 304 connected to at least one external side or end wall of the container 302. The layer of material may be configured to protect the plurality of battery packs 308a-c from damage. For example, the layer of material may be configured to protect the plurality of battery packs 308a-c from damage during impact. The layer of material 304 may be of any thickness. For example, the layer of material 304 may have a thickness of one, two, three, four, or five inches. The layer of material 304 may be, for example, one or more crush beams. The layer of material 304 may be riveted on, bolted on, and/or glued on to both external end walls of the container 302.

In some exemplars, aspects include the electric vehicle battery module 300 having one or more additional battery packs 315a-c positioned within the container 302 above the plurality of battery packs 308a-c and adjacent to the frame rails 306. The additional battery packs 315a-c may have a shorter length than the battery packs of the plurality of battery packs 308a-c so as to fit in between the frame rails 306. However, the additional battery packs 315a-c may still have a length that is significantly greater than their height. While three additional battery packs 315a-c are shown in FIG. 3, in some exemplars, only one or two of the additional battery packs 315a-c may be included in the electric vehicle battery module 300. The PDU may be further connected to the one or more additional battery packs 315a-c.

Figure 4:
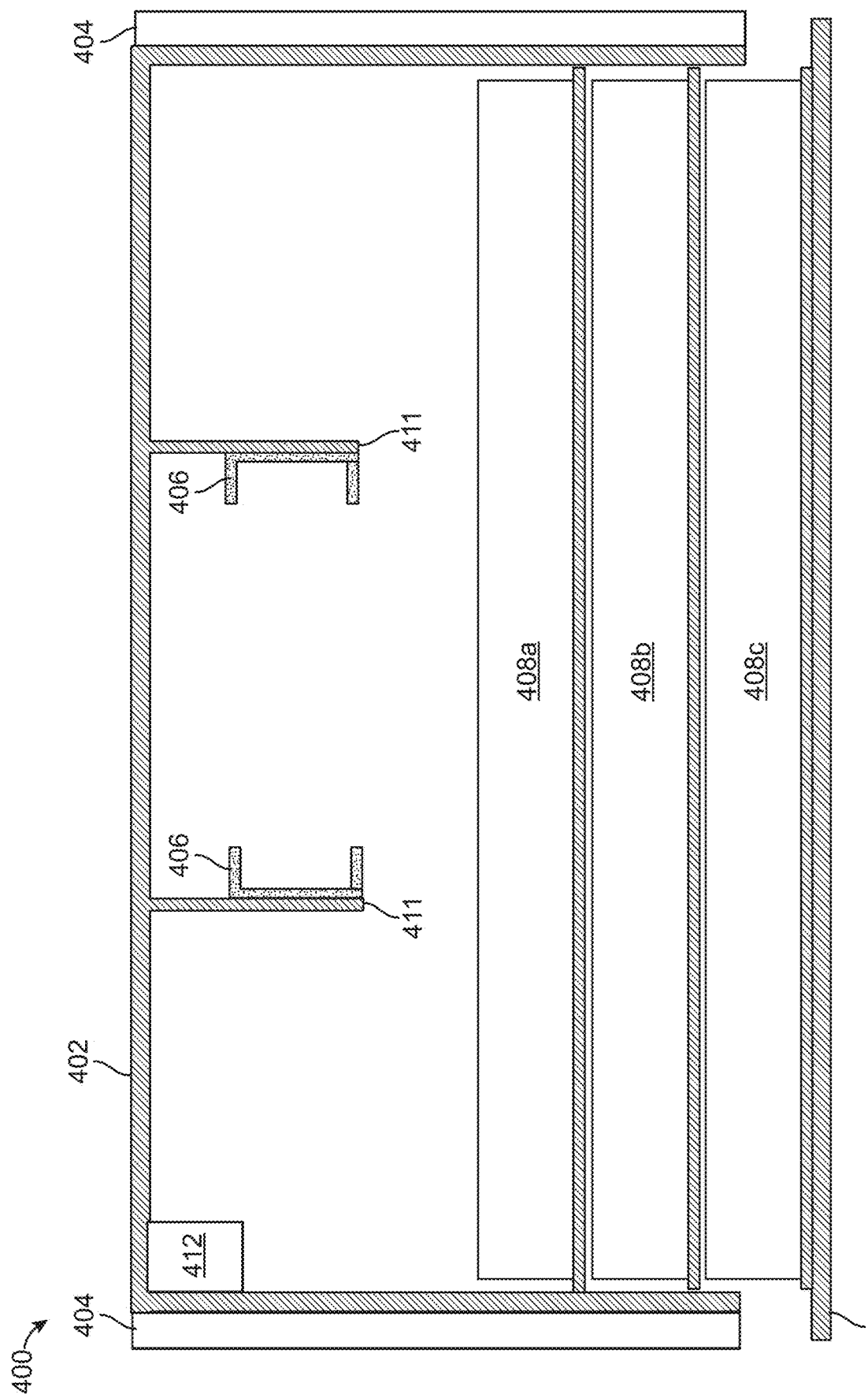
FIG. 4 shows another example electric vehicle battery module.

FIG. 4 shows aspects of an electric vehicle battery module 400. The electric vehicle battery module 400 includes a container 402 configured to be mounted to frame rails 406 (i.e., C-channels) forming at least a portion of a frame of an electric vehicle. For example, the container 402 may include one or more tabs 411 that extend downwards from a top inner wall of the container 402 and are bolted to (or otherwise attached) the frame rails 406. The electric vehicle may be any vehicle, including a truck, a van, or a trailer. The electric vehicle battery module 400 includes a plate 410 configured to fit into an open bottom of the container 402.

The electric vehicle battery module 400 includes a plurality of battery packs 408a-c mounted to the plate 410. The plate 410 including the mounted battery packs 408a-c may be lifted to fit into an open bottom of the container 402 so that the battery packs 408a-c are enclosed within the container 402. If the plate 410 with the mounted battery packs 408a-c is lifted to enclose the battery packs 408a-c within the container 402, the plurality of battery packs 408a-c may be positioned within the container 402 below the frame rails 406.

Each of the plurality of battery packs 408a-c may have a width that is one meter, two meters, three meters, or any other width. Each of the plurality of battery packs 408a-c may have a length that is significantly greater than its height. For example, each of the plurality of battery packs 408a-c may have a length that extends across an entire length of the container 402.

If each of the plurality of battery packs 408a-c has a length that is significantly greater than its height, the plurality of battery packs 408a-c may form a structurally strong battery pack. As such, the plurality of battery packs 408a-c may not need additional structural support from the container 402. The container 402 may protect the plurality of battery packs 408a-c against road debris and moisture. The container 402 may be lightweight so as to not add any unnecessary weight to the electric vehicle battery module 400. The container 402 may or may not provide additional structural support.

The plurality of battery packs 408a-c may be connected to a power distribution unit (PDU). The plurality of battery packs 408a-c may provide power to at least one component of the electric vehicle via the PDU. The PDU to which the plurality of battery packs 408a-c are connected may be located in the accessory module (i.e., in the first module 102). Optionally, the PDU may instead be located inside of the container 402. A PDU 412 may be included inside of the container 402. For example, the PDU 412 may include connections to a motor and/or inverter(s) of the electric vehicle. By including the PDU 412 inside of the container 402, the PDU in the accessory module may be eliminated, thus reducing weight and lowering cost.

In some exemplars, aspects include the electric vehicle battery module 400 having a layer of material 404 connected to at least one external side or end wall of the container 402. The layer of material may be configured to protect the plurality of battery packs 408a-c from damage. For example, the layer of material may be configured to protect the plurality of battery packs 408a-c from damage during impact. The layer of material 404 may be of any thickness. For example, the layer of material 404 may have a thickness of one, two, three, four, or five inches. The layer of material 404 may be, for example, one or more crush beams. The layer of material 404 may be riveted on, bolted on, and/or glued on to both external end walls of the container 402.

In some exemplars, the plurality of battery packs 408a-c may be configured to be removed from the container 402 by lowering the plate 410 including the mounted plurality of battery packs 408a-c from the open bottom of the container 402. In this manner, the plurality of battery packs 408a-c may be easily removed and/or replaced as needed.

Figure 5:
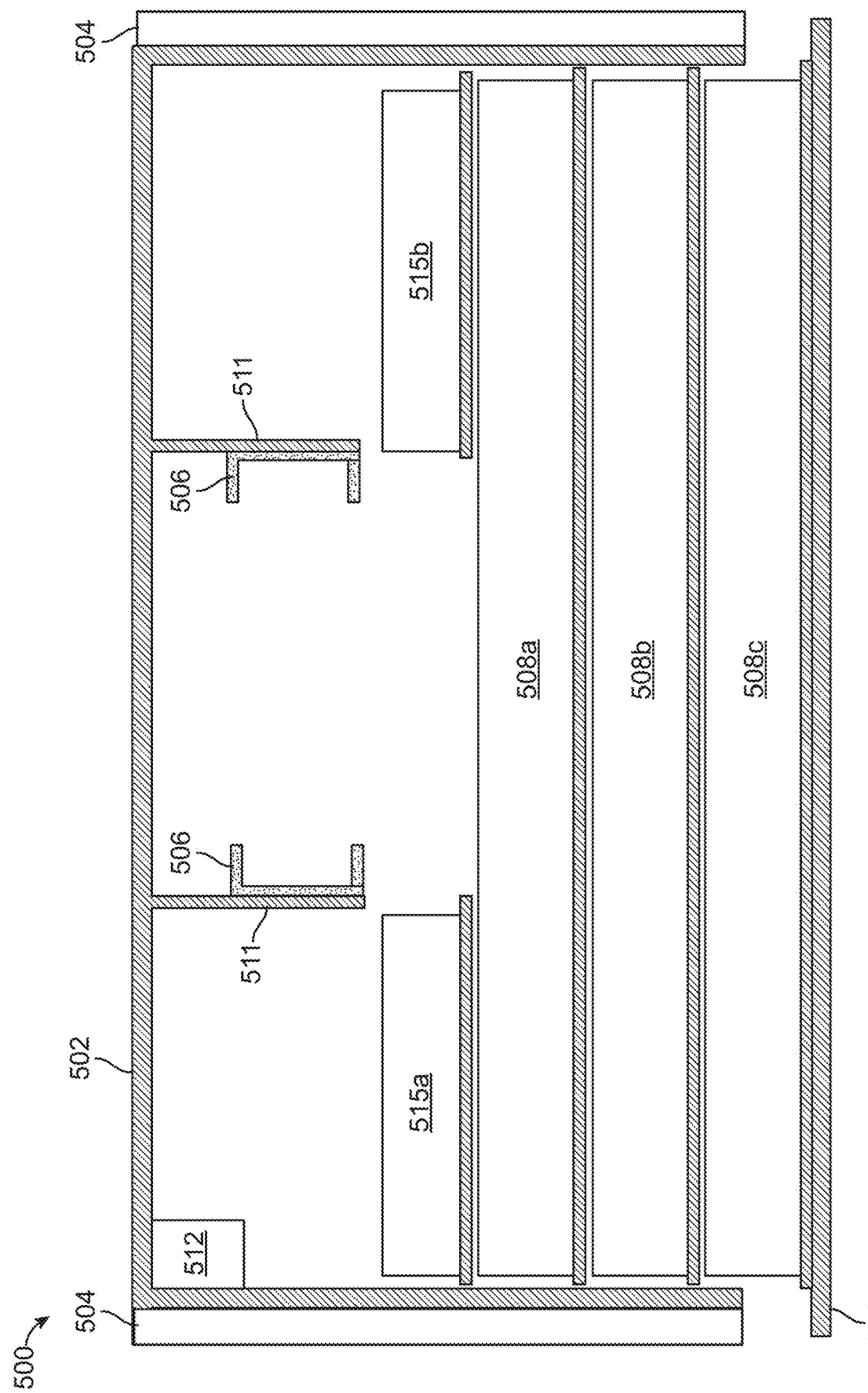
FIG. 5 shows another example electric vehicle battery module.

FIG. 5 shows aspects of an electric vehicle battery module 500. The electric vehicle battery module 500 includes a container 502 configured to be mounted to frame rails 506 (i.e., C-channels) forming at least a portion of a frame of an electric vehicle. For example, the container 502 may include one or more tabs 511 that extend downwards from a top inner wall of the container 502 and are bolted to (or otherwise attached to) the frame rails 506. The electric vehicle may be any vehicle, including a truck, a van, or a trailer. The electric vehicle battery module 500 includes a plate 510 configured to fit into an open bottom of the container 502.

The electric vehicle battery module 500 includes a plurality of battery packs 508a-c mounted to the plate 510. The plate 510 including the mounted battery packs 508a-c may be lifted to fit into an open bottom of the container 502 so that the battery packs 508a-c are enclosed within the container 502. If the plate 510 with the mounted battery packs 508a-c is lifted to enclose the battery packs 508a-c within the container 502, the plurality of battery packs 508a-c may be positioned within the container 502 below the frame rails 506.

Each of the plurality of battery packs 508a-c may have a width that is one meter, two meters, three meters, or any other width. Each of the plurality of battery packs 508a-c may have a length that is significantly greater than its height. For example, each of the plurality of battery packs 508a-c may have a length that extends across an entire length of the container 502.

If each of the plurality of battery packs 508a-c has a length that is significantly greater than its height, the plurality of battery packs 508a-c may form a structurally strong battery pack. As such, the plurality of battery packs 508a-c may not need additional structural support from the container 502. The container 502 may protect the plurality of battery packs 508a-c against road debris and moisture. The container 502 may be lightweight so as to not add any unnecessary weight to the electric vehicle battery module 500. The container 502 may or may not provide additional structural support.

The plurality of battery packs 508a-c may be connected to a power distribution unit (PDU). The plurality of battery packs 508a-c may provide power to at least one component of the electric vehicle via the PDU. The PDU to which the plurality of battery packs 508a-c are connected may be located in the accessory module (i.e., in the first module 102). Optionally, the PDU may instead be located inside of the container 502. A PDU 512 may be included inside of the container 502. For example, the PDU 512 may include connections to a motor and/or inverter(s) of the electric vehicle. By including the PDU 512 inside of the container 502, the PDU in the accessory module may be eliminated, thus reducing weight and lowering cost.

In some exemplars, aspects include the electric vehicle battery module 500 having a layer of material 504 connected to at least one external side or end wall of the container 502. The layer of material may be configured to protect the plurality of battery packs 508a-c from damage. For example, the layer of material may be configured to protect the plurality of battery packs 508a-c from damage during impact. The layer of material 504 may be of any thickness. For example, the layer of material 504 may have a thickness of one, two, three, four, or five inches. The layer of material 504 may be, for example, one or more crush beams. The layer of material 504 may be riveted on, bolted on, and/or glued on to both external end walls of the container 502.

In some exemplars, the plurality of battery packs 508a-c may be configured to be removed from the container 502 by lowering the plate 510 including the mounted plurality of battery packs 508a-c from the open bottom of the container 502. In this manner, the plurality of battery packs 508a-c may be easily removed and/or replaced as needed.

In some exemplars, aspects include the electric vehicle battery module 500 having one or more additional battery packs 515a-b positioned within the container 502 above the plurality of battery packs 508a-c and adjacent to the frame rails 506. The additional battery packs 515a-b may have a shorter length than the battery packs of the plurality of battery packs 508a-c so as to fit in between the frame rails 506. However, the additional battery packs 515a-b may still have a length that is significantly greater than their height. While two additional battery packs 515a-b are shown in FIG. 5, in some exemplars only one of the additional battery packs 515a-b may be included in the electric vehicle battery module 500. In some exemplars, a third additional battery pack may be positioned in between the frame rails 506. The PDU may be further connected to the one or more additional battery packs 515a-b.

In some exemplars, the battery packs in any of the electric vehicle battery modules described above with regards to FIGS. 2-5 may be stacked and/or affixed together. For example, the battery packs in any of the electric vehicle battery modules described above may be bolted together.

The skilled artisan and those of ordinary skill in the art will recognize that there are a plethora of affixing means which may be used in attaching the packs and that those attachments would be within the scope of the disclosure.

Figure 6:
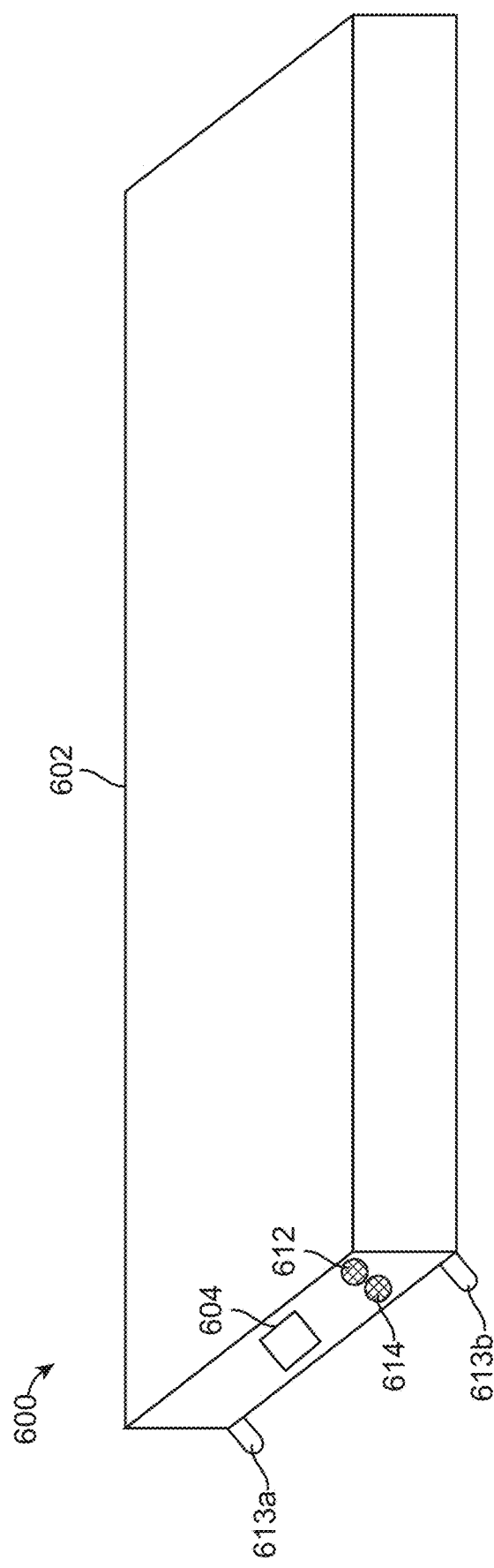
FIG. 6 shows connections of a battery pack for use in an electric vehicle battery module.

Any suitable battery pack may be utilized used in any of the electric vehicle battery modules described above with regard to FIGS. 2-5. FIG. 6 shows an isometric view of a battery pack 600. The battery pack 600 may be used in any of the battery assemblies described above with regard to FIGS. 2-5. The battery pack 600 includes a battery stack and an enclosure 602 enclosing the battery stack. The battery stack may include a plurality of layers comprising a cathode with an active coating, a separator, and an anode with an active coating. The plurality of layers may be wound to form a jelly roll structure or can be stacked to form a stacked-cell structure. The plurality of layers may be enclosed within the enclosure 602 and immersed in an electrolyte.

The battery pack 600 includes an anode terminal 612 and a cathode terminal 610. The anode terminal 612 and the cathode terminal 610 may extend from the enclosure 602. The anode terminal 612 and the cathode terminal 610 may be connected to the battery stack. For example, the anode terminal 612 may be connected to an anode layer in the plurality of layers in the battery stack. Likewise, the cathode terminal 610 may be connected to a cathode layer in the plurality of layers in the battery stack.

In some exemplars, the battery pack 600 includes water cooling connections 613a-b that extend from the enclosure 602. The connection 613a may be an input nozzle, and the connection 613b may be an output nozzle. The connections 613a-b may be connected to a thermal control unit that is located in the accessory module (i.e., in the first module 102). Coolant may be run between the thermal control unit and the connections 613a-b so as to heat and cool the battery pack 600 sufficiently.

In some exemplars, the battery pack 600 includes a manual service disconnect (MSD) 604. The MSD 604 is a manual maintenance protection switch with high-voltage interlock function. The MSD 604, when pulled out, is configured to disconnect the battery pack 600 and protect it from short circuits.

Figure 7:
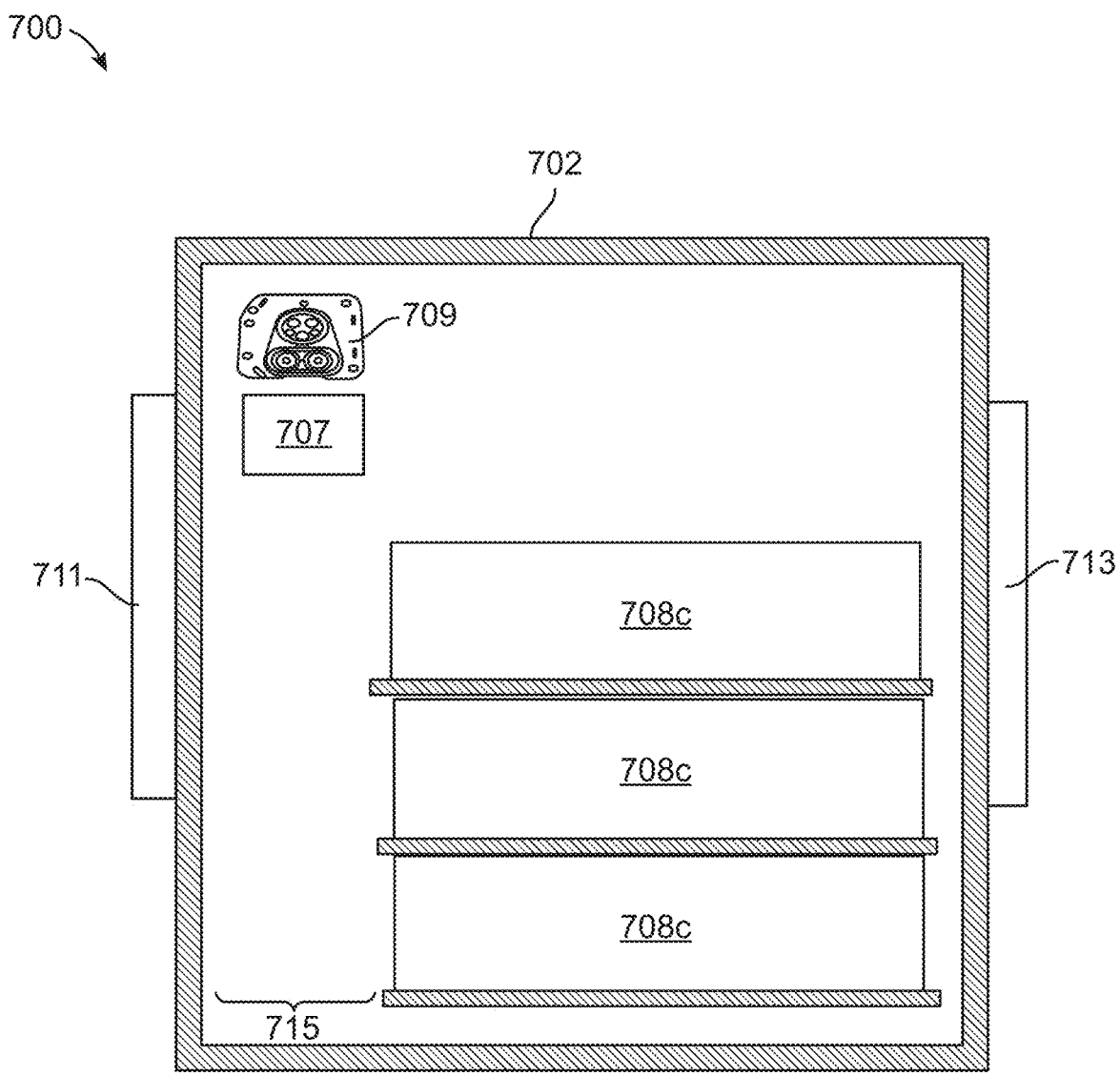
FIG. 7 shows an example side view of an electric vehicle battery module.

FIG. 7 shows a front-end view of an electric vehicle battery module 700. The electric vehicle battery module 700 may be any of the electric vehicle battery modules described above (i.e., module 200, 300, 400, 500). The electric vehicle battery module 700 includes a plurality of battery packs 708a-c. The plurality of battery packs 708a-c may be stacked and/or affixed together. The container 702 may be any of the containers described above (i.e., the container 202 with the lid 210, the container 302 with the lid 310, the container 402 with the plate 410, or the container 502 with the plate 510).

In some exemplars, the electric vehicle battery module 700 includes a manual service disconnect (MSD) 706. The MSD 702 is a manual maintenance protection switch with high-voltage interlock function. The MSD 702, when pulled out, is configured to disconnect the electric vehicle battery module 700 and protect it from short circuits. The electric vehicle battery module 700 includes a charging connector 709. The charging connector 709 may be mounted to at least one outer wall of the container 702 (such as the front-end). The charging connector 709 is configured to provide power to the battery packs 708a-c from an external power source to recharge the battery packs 708a-c. A space 715 may be included in the electric vehicle battery module 700 for electrical connections. For example, the space 715 may be about three to five inches past the battery packs 708a-c.

In some exemplars, the electric vehicle battery module 700 includes connector plates 711, 713. The connector plate 711 may be bolted to the container 702. The connector plate 711 may be used to connect the electric vehicle battery module 700 to one or more components of the electric vehicle, such as the drive system and/or the accessory module. For example, the connector plate 711 may be used to provide low voltage power from the electric vehicle battery module 700 to one or more components of the electric vehicle, such as the drive system and/or the accessory module. The connector plate 713 may be used to connect the electric vehicle battery module 700 to one or more other components of the electric vehicle, such as motor and/or inverters.

As discussed above with regard to FIG. 6, each battery pack in the electric vehicle battery module 700 may include water cooling connections that extend from the enclosure. The connections may be connected to a thermal control unit that is located in the accessory module (i.e., in the first module 102). Coolant may be run between the thermal control unit and the connections so as to heat and cool each battery pack sufficiently. The electric vehicle battery module 700 may include a connector that connects the thermal control unit to each of the battery packs in the electric vehicle battery module 700.

Figure 8:
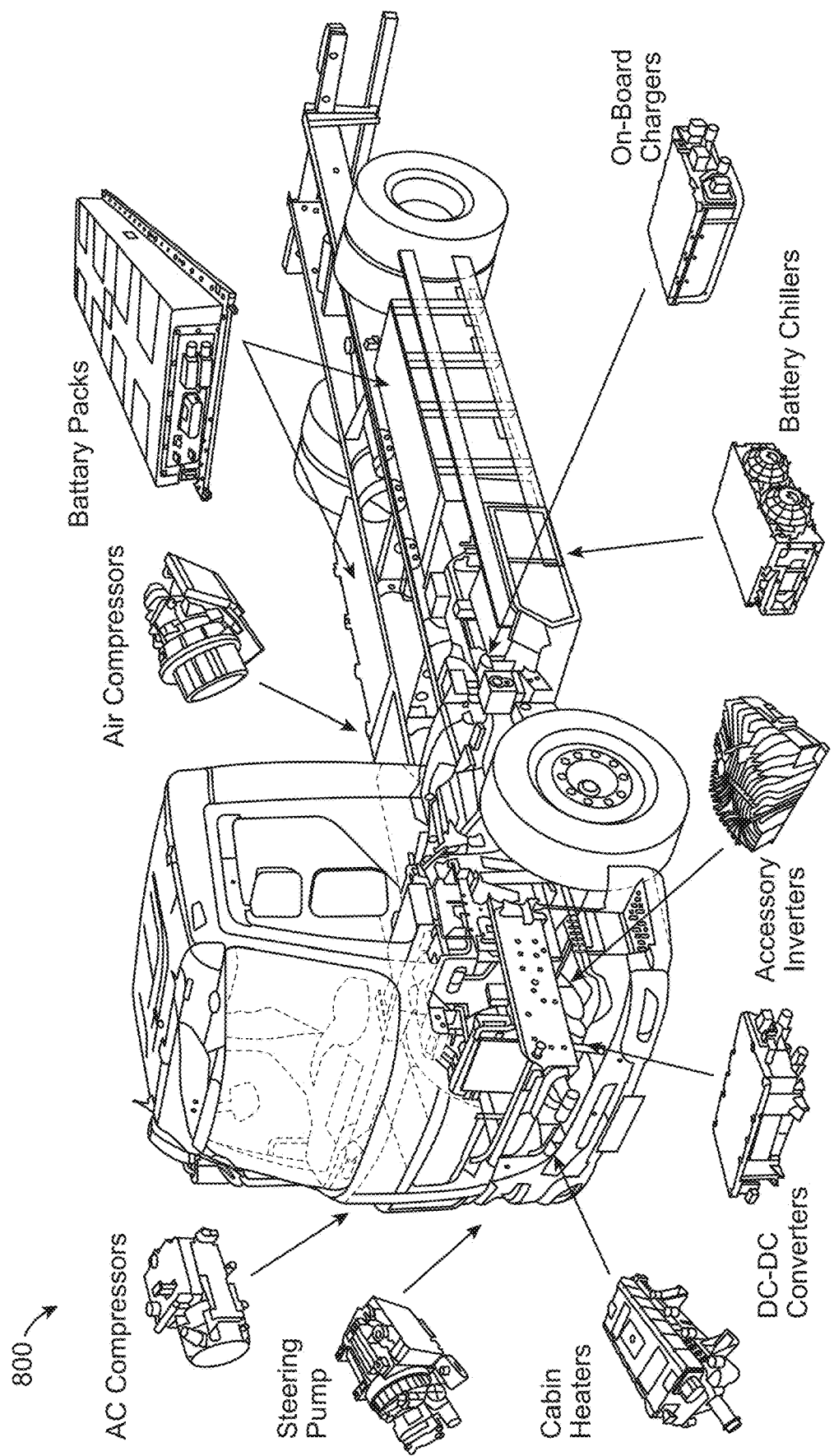
FIG. 8 shows an example components of an electric vehicle system that can be powered by an electric vehicle battery module.

FIG. 8 shows a diagram 800 depicting the various components of an electric vehicle that may be powered by any of the electric vehicle battery modules described above with regard to FIGS. 1-7. These components are not limiting, and the electric vehicle battery modules described above with regard to FIGS. 1-7 may power different or additional components of an electric vehicle. The components that may be powered by any of the electric vehicle battery modules described above include: AC compressors, a steering pump, a cabin heater, a DC-DC converter, an accessory inverter, an air compressor, a battery chiller, and/or an on-board charger. Other components that are not depicted, such as a main driver inverter and/or a motor may additionally or alternatively be powered by any of the electric vehicle battery modules described above.

Figure 9:
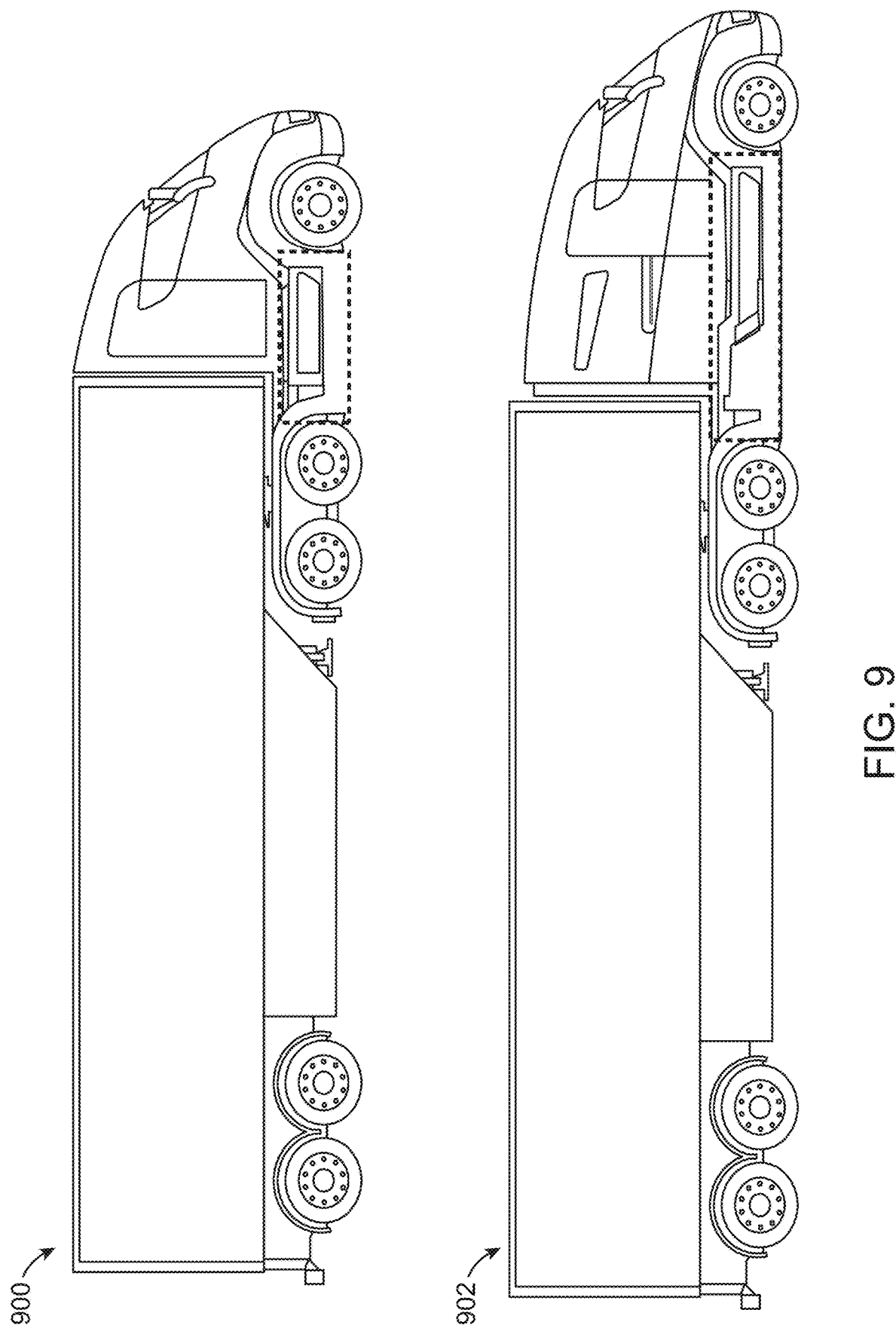
FIG. 9 shows example electric vehicle battery modules of different sizes.

FIG. 9 illustrates electric vehicle battery modules on two different trucks 900 and 902. The electric vehicle battery modules are located between the front axle and the front of the rear axle in both trucks 900 and 902. However, the trucks 900 and 902 have different sized wheelbases (i.e., distance between the front axle and rear axle). For example, the truck 902 has a longer wheelbase than the truck 900. Trucks with longer wheelbases, such as the truck 902, may typically include a sleeper and may be used for driving longer distances. Due to the longer wheelbase, the truck 902 may include a larger electric vehicle battery module than the truck 900. As a result of the larger electric vehicle battery module, the truck 902 may be able to drive longer distances than the truck 900.

There are various popular truck models that exist today. Each of these truck models has its own unique styling and dimensional constraints. The electric vehicle battery modules described above with regard to FIGS. 1-8 may be utilized with each of these different styles of trucks. For example, if a truck includes steps for the driver to enter the vehicle, these steps may be bolted outside of the electric vehicle battery module. One stylistic different that exists between these various truck models is the frame rail spread (i.e., the distance between the frame rails). To accommodate these varying frame rail spreads, the vertical walls in the containers described above may have to be custom-built for each of the different frame rails spreads. Alternatively, the vertical walls in the containers may be spaced apart by a standard size, and spacer panels may be utilized to adjust for the varying frame rail spreads.

Figure 10:
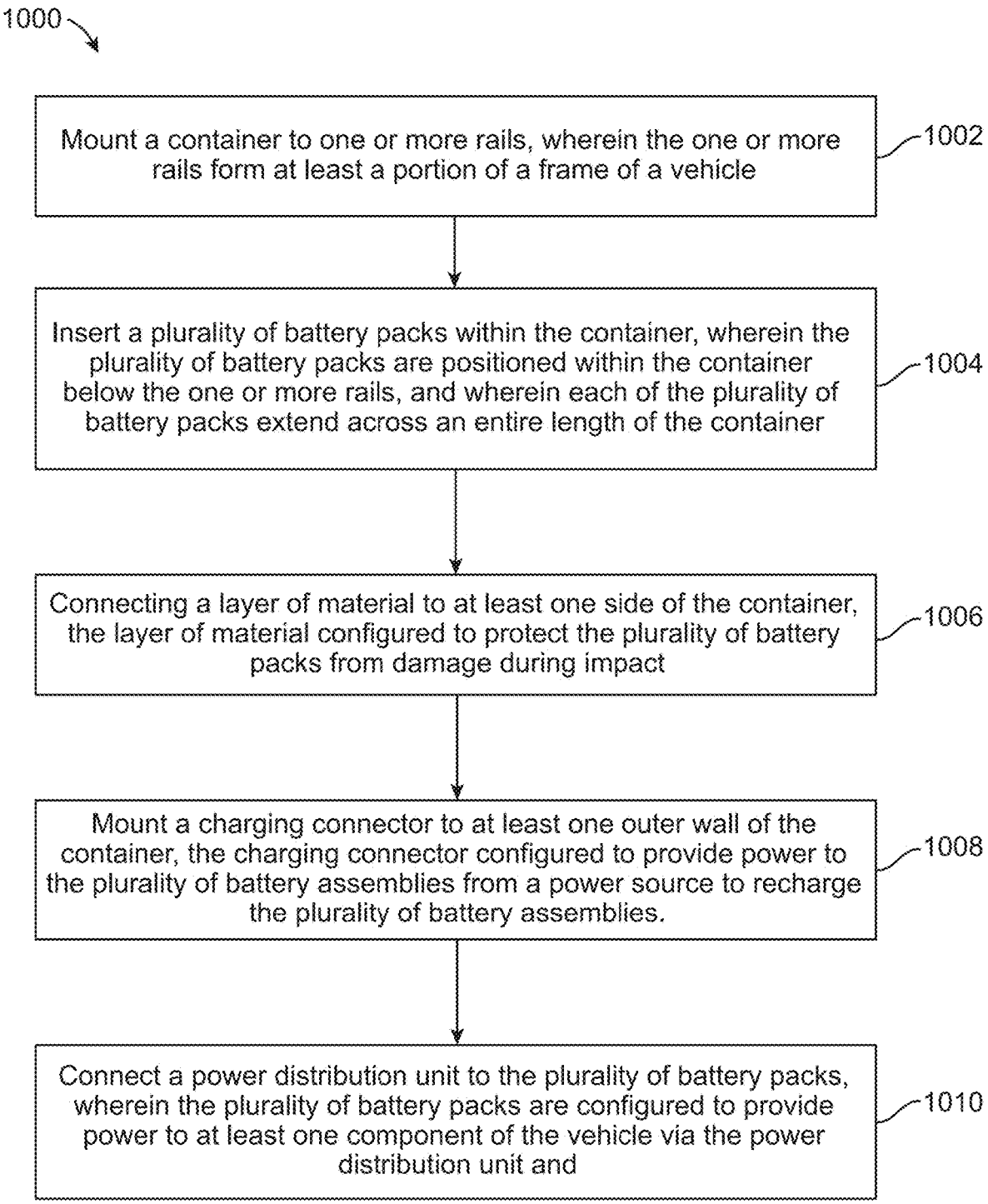
FIG. 10 illustrates an example method for assembling an electric vehicle battery module.

FIG. 10 shows a method 1000 for assembling a battery power system. At operation 1002, a container may be mounted to one or more rails. The one or more rails may form at least a portion of a frame of a vehicle, such as an electric vehicle. The container may be any of the containers described above with regard to FIGS. 2-5. The vehicle may be, for example, a truck, a van, or a trailer. Mounting the container to the one or more rails may comprise bolting a portion of the container, such as one or more tabs in the container, to the one or more rails.

At operation 1004, a plurality of battery assemblies may be inserted within the container. The plurality of battery packs may be inserted within the container so that they are positioned within the container below the one or more rails when the container is mounted to the one or more rails. Each of the plurality of battery packs may extend across an entire length of the container. If each of the plurality of battery packs has a length that is significantly greater than its height, the plurality of battery packs may form a structurally strong battery pack. As such, the plurality of battery packs may not need additional structural support from the container. The container may protect the plurality of battery packs against road debris and moisture. The container may be lightweight so as to not add any unnecessary weight to the electric vehicle battery module. The container may or may not provide additional structural support.

In some exemplars, the plurality of battery packs may be mounted to a plate and inserting the plurality of battery packs within the container may comprise lifting the plate to which the plurality of battery packs are mounted into an open bottom of the container. In other embodiments, the plurality of battery packs may be inserted within the container by stacking them in one or more cavities of the container.

At operation 1006, a layer of material may be connected to at least one side of the container. The layer of material configured to protect the plurality of battery packs from damage during impact. The layer of material may be of any thickness. For example, the layer of material may have a thickness of one, two, three, four, or five inches. The layer of material may be, for example, one or more crush beams. The layer of material may be riveted on, bolted on, and/or glued on to both external end walls of the container.

At operation 1008, a charging connector may be mounted to at least one outer wall of the container. The charging connector may be configured to provide power to the plurality of battery packs, such as from an external power source, to recharge the plurality of battery packs.

At operation 1010, a power distribution unit (PDU) may be connected to the plurality of battery packs. The plurality of battery packs may be configured to provide power to at least one component of the vehicle via the PDU. As described above, the PDU may be located in the container or may instead be located in the accessory module of the vehicle. The at least one component may comprise a main driver inverter, a motor, a steering pump, an AC compressor, a DC-DC converter, a cabin heater, a cooling system, a charger, an air compressor, an accessory inverter, and/or any other component of the vehicle.

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise.

As used herein, the statement that two or more parts or components are "coupled" or "connected" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

These drawings may not be drawn to scale and may not precisely reflect structure or performance characteristics of any given embodiment and should not be interpreted as defining or limiting the range of values or properties encompassed by example embodiments.

While systems and methods have been described in connection with the various embodiments of the various figures, it will be appreciated by those skilled in the art that changes could be made to the embodiments without departing from the broad inventive concept thereof. It is understood, therefore, that this disclosure is not limited to the particular embodiments disclosed, and it is intended to cover modifications within the spirit and scope of the present disclosure as defined by the claims. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another exemplar includes from the one particular value and/or to the other particular value. Similarly, when values are expressed as approximations, by use of the antecedent "about." it will be understood that the particular value forms another exemplar. All ranges are inclusive and combinable.

As used in the specification and the appended claims, ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It is to be appreciated that certain features of the disclosure which are, for clarity, described herein in the context of separate exemplar, may also be provided in combination in a single exemplary implementation. Conversely, various features of the disclosure that are, for brevity, described in the context of a single exemplary implementation, may also be provided separately or in any sub-combination. Further, reference to values stated in ranges include each and every value within that range.

What is claimed is:

1. A battery power system, the system comprising:
   a vehicle having a frame, wherein one or more rails form at least a portion of the frame;

an enclosure configured to be mounted to the one or more rails;

a plurality of cell string battery packs positioned within the enclosure below the one or more rails, wherein each of the plurality of cell string battery packs is configured as a structural beam which extends across an entire length of the enclosure; and, wherein the plurality of cell string battery packs are formed structural beams configured to cooperate with the enclosure to function as a monolithic block; and, wherein the structural beams are configured to improve the resisting bending moment of the chassis in at least one of the vertical and lateral direction.

2. The battery power system of claim 1, the system further comprising:

one or more additional cell string battery packs positioned within a container above the plurality of cell string battery packs and adjacent to the one or more rails;

wherein the plurality of cell strings battery packs are configured to form an electrical connection to at least one of an electrical component of the vehicle and a power distribution unit.

3. The battery power system of claim 1, further comprising a layer of material connected to at least one side of the at least one of the enclosure and, the layer of material configured to protect the plurality of cell string battery packs from damage during impact.

4. The battery power system of claim 1, wherein the battery packs of the plurality of cell string battery packs are stacked on top of each other.

5. The battery power system of claim 1, further comprising a lid configured to cover an open top of the enclosure enclosing the plurality of cell string battery packs.

6. The battery power system of claim 1, further comprising a plate to which the plurality of cell string battery packs are configured to be mounted, and wherein the plurality of cell string battery packs are configured to be inserted into the enclosure by lifting the plate including the mounted plurality of cell string battery packs into an open bottom of the enclosure.

7. The battery power system of claim 1, wherein the enclosure is configured to be mounted to the one or more rails by:

affixing a portion of the container to the one or more rails; or lowering the enclosure over the one or more rails.

8. The battery power system of claim 1, further comprising at least one component of a main driver inverter, a motor, a steering pump, an AC compressor, a DC-DC converter, a cabin heater, a cooling system, a charger, an air compressor, an accessory inverter.

9. The battery power system of claim 1, further comprising a charging connector mounted to at least one outer wall of the container, the charging connector configured to provide power to the plurality of cell string battery packs from a power source to recharge the plurality of cell string battery packs.

10. The battery power system of claim 1, wherein the vehicle is a truck, a van, or a trailer.

11. A method for assembling a battery power system, the method comprising:

mounting an enclosure to one or more rails, of a chassis, wherein the one or more rails form at least a portion of a frame of a vehicle;

inserting a plurality of cell string battery packs formed into structural beams within the enclosure, and wherein each of the plurality of cell string battery packs are formed into structural beams extend across an entire length of the enclosure;

wherein the structural beams across the enclosure improve the resisting bending moment of the chassis in at least one of the vertical and lateral direction; and, wherein the enclosure protects against road debris and moisture.

12. The method of claim 11, the method further comprising:

the plurality of cell string battery packs are configured to form an electrical connection to at least one of an electrical component of the vehicle and a power distribution unit.

13. The method of claim 11, further comprising:

connecting a layer of material to at least one side of the enclosure, the layer of material configured to protect the plurality of cell string battery packs from damage during impact.

14. The method of claim 11, the method further comprising at least one component of a main driver inverter, a motor, a steering pump, an AC compressor, a DC-DC converter, a cabin heater, a cooling system, a charger, an air compressor, an accessory inverter.

15. The method of claim 11, further comprising:

mounting a charging connector to at least one outer wall of the enclosure, the charging connector configured to provide power to the plurality of cell string battery packs from a power source to recharge the plurality of cell string battery packs.

16. The method of claim 11, wherein the vehicle is a truck, a van, or a trailer.

* * * * *